July 21, 1953  J. R. DAWSON, SR  2,646,235
BUOYANT AIRCRAFT WITH HYDROSKIS
Filed May 29, 1951  3 Sheets-Sheet 1
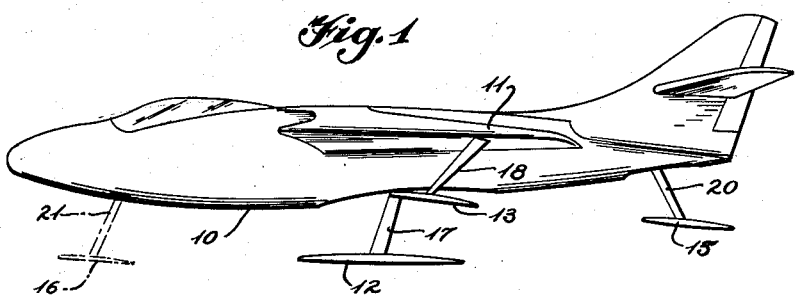
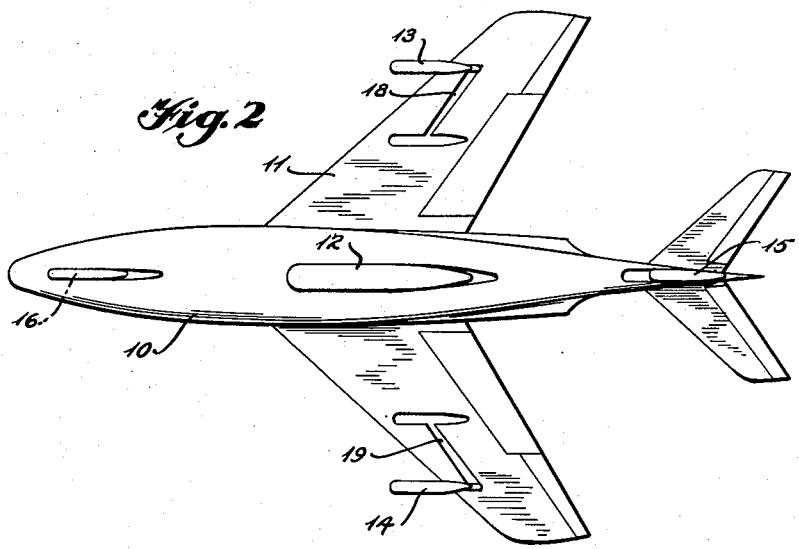
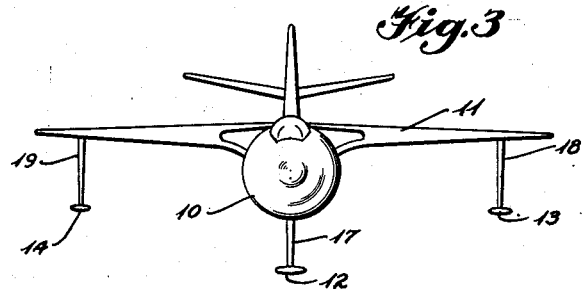
INVENTOR.
John R. Dawson, Sr.

July 21, 1953  J. R. DAWSON, SR  2,646,235
BUOYANT AIRCRAFT WITH HYDROSKIS
Filed May 29, 1951  3 Sheets-Sheet 2
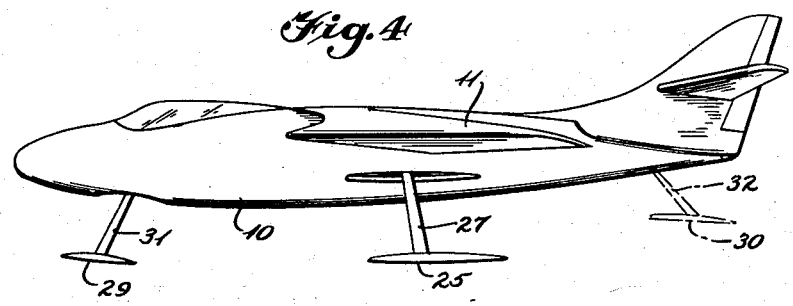
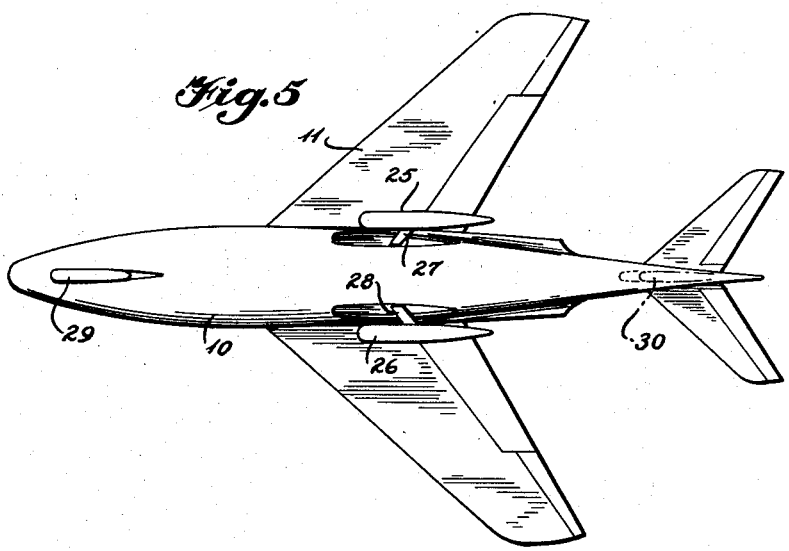
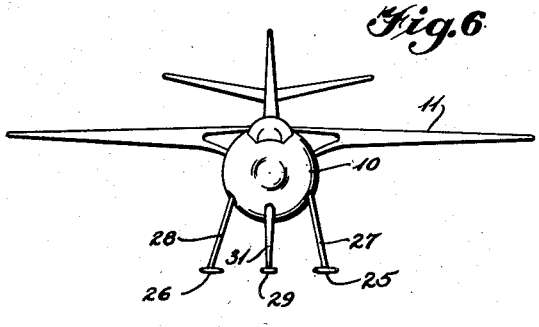
INVENTOR.
John R. Dawson, Sr.

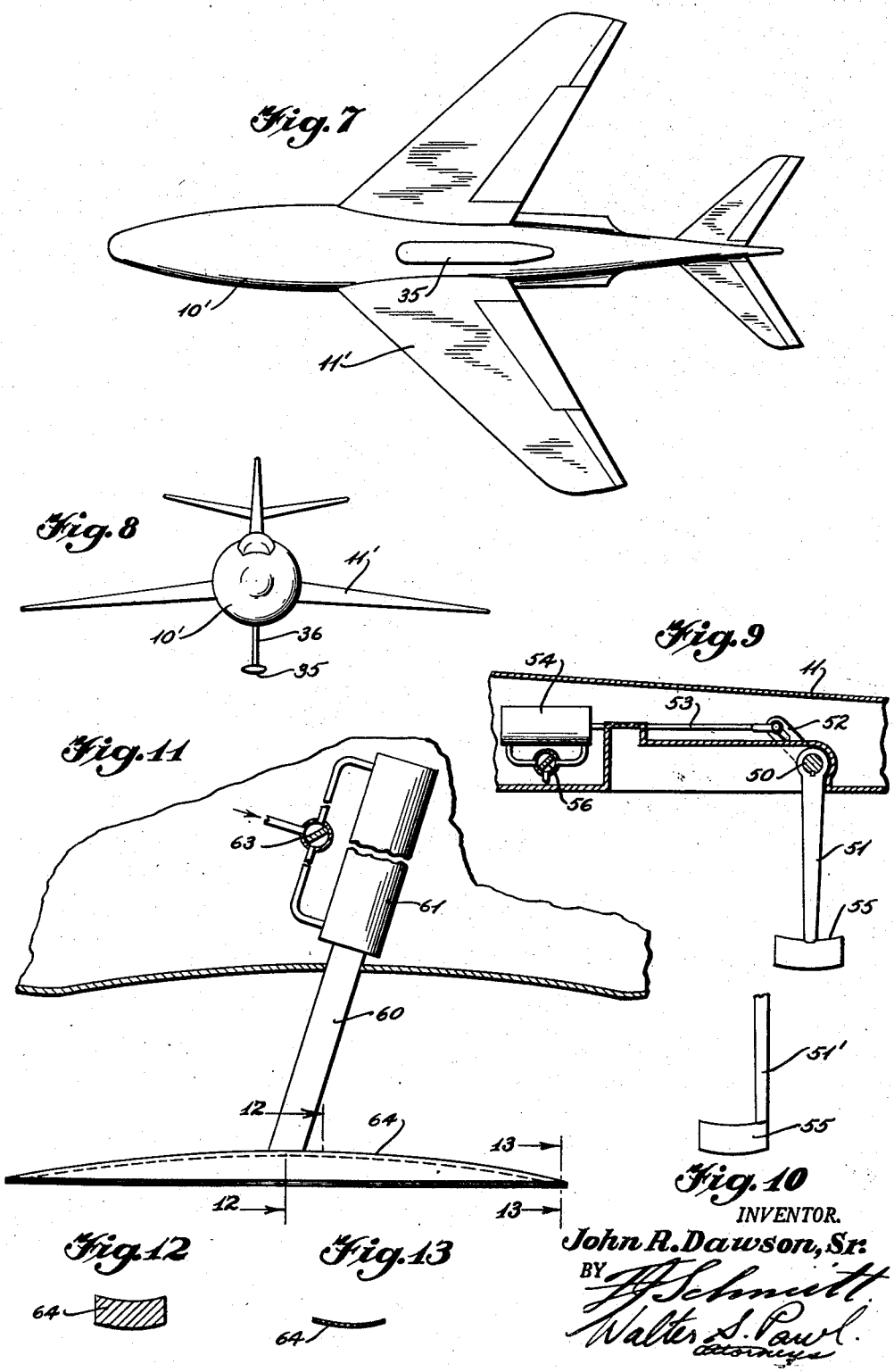

UNITED STATES PATENT OFFICE 2,646,235

BUOYANT AIRCRAFT WITH HYDROSKIS

John R. Dawson, Sr., Hampton, Va.

Application May 29, 1951, Serial No. 228,961

4 Claims. (Cl. 244—105)

(Granted under Title 35, U. S. Code (1952), sec. 266)

This invention relates to aircraft, including amphibian aircraft which can take-off from and land on water and other surfaces. Airplanes constructed in accordance with the present improvements may descend to contact with deep or shallow water and subsequently be brought to rest in water or on a beach. They may land and take-off from other surfaces such as ice and snow.

More particularly the invention is directed to airplanes which may be either jet or propeller powered and which are equipped with depending hydroskis. The hydroskis may be of solid construction such as solid aluminum and they provide dynamic lift when running submerged in water or planing on the surface of the water for supporting an airplane during take-off and landing. During normal flight the hydroskis may be retracted and become a portion of the surface of the fuselage or wings. The present concept admits of considerable variation in the form of the airplane fuselage and wings forming the body of the plane and in the form of the hydroskis.

Prior to the present improvements, flying boats and seaplanes having hulls or floats to provide buoyancy to hydrostatically support an airplane, were known. Hydrofoils have been used as a substitute for the planing bottom on floats. Hydrofoils, however, are of substantial width and have an aspect ratio (the square of the span divided by the plan-form area) greater than one. Hydrofoils have their upper surface curved chordwise so that running submerged in water they develop hydrodynamic lift by suction on the upper surface in combination with positive pressure on the lower surface. Snow skis have been used as an attachment for landing and taking off on snow and ice. They are not, however, designed for use on water. Hydroskis may have a plan area approximately one-third (⅓) that of conventional snow skis.

The above and all other landing gear devices of which I am aware differ materially from the present concept both in structure and function.

According to the invention there is provided an airplane having a fuselage and wings forming the body of the plane. The lower portion of the body is water tight and buoyant to provide hydrostatic or hydrodynamic supporting according to requirements of the particular design. Extending downwardly, and preferably but not necessarily retractably mounted, are one or more supports for a hydroski. The term hydroski, as used in the present description and claims, may be defined as a member which is joined to an airplane and which provides hydrodynamic lift for the airplane while running under the water or planing upon the water. Unlike the hydrofoil, it has an aspect ratio of less than unity.

The hydroski differs from a seaplane float in that it provides no material buoyancy. The present invention contemplates the total immersion of the relatively small hydroski and the use of streamlined struts to which the hydroski is rigidly secured. The streamlining of the struts is to insure that resistance to movement through water will be minimized. The struts may retract pivotably or axially so that both the hydroski and strut or the hydroski will fit into the body portion in a manner to provide a smooth body surface during normal flight.

While the hydroskis may be solid they are not necessarily solid and may provide some buoyancy. This buoyancy, however, will in no case hydrostatically support as much as fifty (50%) percent of the weight of the whole aircraft. Preferably their design and construction will be such that their collective weight will either somewhat exceed that of the water displaced by them or that the buoyancy provided will be less than ten (10%) percent of the weight of the plane. It will accordingly be seen that the buoyancy provided is incidental to design and that small size and other factors herein set forth are controlling.

As previously mentioned the aspect ratio of a hydroski is less than unity. In fact there are a number of successful designs having aspect ratios from about .1 or less to .5. This range includes many configurations which can "knife" through water in taking off and landing operations with a minimum of resistance to forward motion. This is important because in take-off from water the greatest resistance to the propelling thrust may occur just prior to the body portion of the plane leaving the water although this may be varied within reasonable limits. For example, a typical take-off of a jet plane weighing 13,500 pounds and constructed according to the invention will include the plane moving through water with the hydroskis and struts submerged and the watertight body portion and hydroskis providing hydrodynamic buoyancy. At approximately 38 to 40 miles per hour the body portion leaves the water and the hydroskis move on and along the surface until at about 148 miles per hour the plane will take off from the water and the hydroskis may be retracted for normal high-speed flight.

An object of invention is to provide an aircraft having a body with a water-tight lower portion and one or more hydroskis extending below said body.

Another object is to provide a landing gear that does not impair the low drag qualities of an airplane and permits landing on water with less impact load on the airplane body.

Another object is to provide a landing gear which is smaller than hulls and floats and which is strong to withstand high speed water loads with the result that lighter airplane structure may be constructed.

Another object is to provide a landing gear which does not require very long concrete runways but which may use land or water and combinations of each for landing and take-off operations.

Another object is to provide a seaplane equipped with hydroskis extending below.

Another object is to provide aircraft provided with hydroskis which provide lift when running submerged or on the surface of the water.

Another object is to provide an aircraft with hydroskis and streamlined supporting struts to which the hydroskis are rigidly secured.

Another object is to provide an aircraft equipped with hydroskis which offer a minimum of resistance to forward motion of the aircraft while the hydroskis are submerged and which will provide support to the aircraft when the hydroskis are moving on the surface of the water.

Another object is to provide an aircraft equipped with hydroskis, the bottom surface of which provides the greater portion of the lift when running submerged.

Another object is to provide an aircraft equipped with hydroskis which are tapered at their trailing edges to reduce bounce or pitch and thus increase the landing stability on water.

Another object is to provide an aircraft equipped with hydroskis for landing and take-off from water, ice, snow and other surfaces.

These and other objects of invention will be manifest from a consideration of the following description claims and drawings in which:

Fig. 1 is a side elevational view of an aircraft with retractable hydroskis positioned in the wings, as well as centrally of the fuselage. One additional hydroski is positioned either in the front or the rear portion of the fuselage. The front hydroski and support are shown in dotted lines.

Fig. 2 is a bottom plan view of the aircraft of Fig. 1.

Fig. 3 is a front view of the structure of Fig. 1 with the front hydroski omitted from the view.

Figs. 4, 5, and 6 are similar to Figs. 1, 2, and 3 respectively, but show a different arrangement of hydroskis and supports. As in Figs. 1, 2, and 3 either the front or rear hydroski may be eliminated in accordance with requirements.

Figs. 7 and 8 are a bottom plan and front view respectively of a modification in which the wings are secured in a lower portion of the fuselage and slope downwardly so that the wing tips may provide a degree of buoyancy.

Fig. 9 is a schematic view, partly in section, of a wing and one of many types of retracting devices which may be used.

Fig. 10 shows a modified position of joinder for the strut and hydroski of Fig. 9.

Fig. 11 is a schematic view of a vertical hydroski retracting means which is used in the fuselage.

Figs. 12 and 13 are sections of a hydroski on the lines 12—12, 13—13 of Fig. 11.

Referring to the drawings, Figs. 1, 2, and 3 schematically show an aircraft having a fuselage 10 and wings 11 forming the body portion of a jet plane. A set of hydroskis 12, 13, 14, and 15 or 12, 13, 14, and 16 are joined to the plane by streamlined struts 17, 18, 19, and 20 or 21. The struts are preferably retractable so as to position the hydroskis with their bottom surfaces flush with the fuselage and wings during normal flight. The wings are recessed to receive the struts 18 and 19 in a similar manner.

The fuselage 10 is closed at the bottom, the only openings being those in which the struts move and which the struts seal when in place. The wings are set sufficiently high so that they remain above the water during landing and take-off operations. They contain a pivotal support for the struts 18, 19.

The main hydroski 12 is positioned below the center of gravity of the plane; the tail hydroski 15 is placed well aft of the center of gravity and the two side hydroskis 13 and 14 are on the wings and outboard of the center line of the airplane. With this arrangement, i. e. excluding hydroski 16, the airplane rides on the main hydroski 12 and tail hydroski 15. When the hydroskis reach the planing condition and at higher speeds the airplane can be made to ride on the main hydroski alone by proper setting of the conventional controls. The side hydroskis provide lateral stability at low planing speeds where the aerodynamic control is insufficient to maintain lateral stability. It will be noticed that the main hydroski of the embodiments of Fig. 1 is lower than the others except when a front hydroski is used. The latter may be slightly inclined to facilitate the approach and movement out of water onto a beach.

Figs. 4, 5, and 6 differ from Figs. 1, 2, and 3 in that there are no supports for hydroskis in the wings. Instead, two hydroskis 25, 26 are rigidly secured to streamlined supports 27, 28 both of which are retractable into the fuselage on opposite sides of the center line of the plane near the center of gravity. As suggested above either the front or rear hydroski 29 or 31 and its support 30 or 32 may be dispensed with in accordance with requirements.

Figs. 7 and 8 illustrate a modification having only a single hydroski 35 below the center of gravity of the plane. Its streamlined retractable support 36 is rigidly secured to the hydroski 35. In this modification the wings 11' slope downwardly toward their tip as shown and are set low with respect to the fuselage 10'. When the plane is in deep water the wing-tip portions will be immersed so as to supply a portion of the buoyancy with the fuselage.

Fig. 9 shows a recessed wing partly in section. A shaft 50 spans one end of the recess and projects into the inside of the wing. Slotted lever 52, inside the wing and fixed to shaft 50, is connected to piston rod 53 of hydraulic control 54 for the extension and retraction of strut 51 and its rigidly secured hydroski 55. The hydraulic control includes a two way valve 56 for controlling the fluid within the cylinder and the movement of the piston rod 53 in a known manner. Any convenient way of moving the lever 52 may be substituted as the form of actuating means is not critical.

The hydroski 55 may, if desired, be secured to strut 51' as shown in Fig. 10, although the central securing of Fig. 9 is preferred. It will be observed that the structure of Fig. 10 admits of somewhat improved uniformity in the under surface of the wing during normal flight.

Fig. 11 shows a vertical retracting and extending means positioned in the fuselage. The form of hydroski is the same as in Figs. 9 and 10. In this construction the strut 60 may act as a piston rod in cylinder 61. The two-way valve 63 and conventional accessary equipment controls the position of the hydroski 64.

Hydroskis 55 and 64 are concave transversely top and bottom and have line cross sections at their ends as shown in Fig. 13. Fig. 12 represents a near central cross section. The hydroski constructions are preferably those which provide more lift on the bottom and tend to minimize any effect of loss of lift from the top surface when the hydroski moves upwardly from submerged position during take-off. A flat bottom will produce more lift than that shown in Fig. 12 but the latter will fit into the fuselage better.

The hydroskis shown in Figs. 1 thru 8 are convex on the top and bottom and tapered as shown. Those below the center of gravity are preferably generally parallel to the axis of flight of the aircraft.

The leading edge, Fig. 12, is preferably sharp and preferably is not turned up especially for use in water. A construction having a flat forward top portion and an under surface curving rearwardly and downward is practical, however. Turned down lateral edges are excellent for splash control. It may be formed from any light, strong metal or laminated wood and the like which can maintain its position relative to the supporting struts during operation. The sharp leading edge enables the hydroski to knife through waves of 2 or more feet high during a water landing operation without ill effect. The plan form design may vary considerably and may be rectangular, triangular or tapered at the trailing end as shown in Fig. 2 for example. The triangular form may have a short side of the triangle as the leading edge with the other sides tapered to reduce bounce and pitch and cavitation in a manner similar to the plan form shown in Fig. 2. The mountings for the struts may of course include some shock cushioning structure or characteristic if movement is confined to narrow limits but the rigid construction is preferred. If more than one strut is used it is preferred that they be aligned to reduce resistance.

The terms hydrostatic and hydrodynamic lift or buoyancy as used herein refer to lift or support when the aircraft is at rest in or is moving through water, respectively. As will be understood, the ailerons and tail portions of the wings and fuselage are conventional and have not been specifically described. The illustrated embodiments show jet-powered aircraft for which the improvements are particularly useful. They are not, however, limited in application to jet-powered aircraft.

From the above it will be seen that an inherently stable landing gear for water has been provided because as the plane changes its angle of attack as is normal at take-off, the hydroskis, even though rigid, will automatically assume a position giving additional assurance against bounce or pitch.

The main hydroskis have been described as positioned below the center of gravity. It will be understood that it is not necessary that the point of securing be directly under the center of gravity. Some part of the main hydroski is below the center of gravity of the plane.

It is not desired that the scope of the invention be limited to the described embodiments but rather only by the scope of the attached claims and their legal equivalents.

The invention described herein may be manufactured or used by or for the Government of the United States of America for governmental purposes without the payment of any royalties thereon or therefor.

I claim:

1. An aircraft having a body which includes a fuselage and wings, said body having a watertight lower portion which will provide sufficient buoyancy to support the aircraft in deep water, a hydroski supported by said aircraft body and having an aspect ratio less than unity, a streamlined strut connected to the hydroski and extending upwardly to the body, said strut having a width less than the span of the hydroski, means for retracting the hydroski into the body of the aircraft, the hydroski and body forming an approximately continuous surface when the hydroski is retracted, said hydroski being inclined upwardly over its length and toward its leading edge, and the trailing end of the hydroski being tapered rearwardly.

2. The combination of claim 1 further defined in that the hydroski has no inherent or hydrostatic buoyancy, said hydroski being of solid construction and rigidly secured to the streamlined strut and shaped to provide hydrodynamic lift during movement while submerged or on the surface of water.

3. An aircraft having a body which includes a fuselage and wings, said body having a watertight lower portion which will provide sufficient buoyancy to support the aircraft in deep water, a hydroski spaced from and positioned below the fuselage near the center of gravity of the aircraft and having an aspect ratio less than unity, streamlined means connecting said hydroski to said fuselage, and another hydroski positioned below and on each side of the center of gravity of the aircraft.

4. The combination defined in claim 3 further defined in that the hydroski is retractable and that the bottom of the hydroski and the fuselage form a smooth surface when the hydroski is in fully retracted position.

JOHN R. DAWSON, Sr.

References Cited in the file of this patent

UNITED STATES PATENTS

| Number | Name | Date |
|---|---|---|
| 1,165,770 | Gallaudet | Dec. 28, 1915 |
| 1,776,700 | Pegna | Sept. 23, 1930 |
| 1,815,303 | Kloen | July 21, 1931 |
| 2,131,528 | Soyer | Sept. 27, 1938 |

FOREIGN PATENTS

| Number | Country | Date |
|---|---|---|
| 354,841 | Germany | June 16, 1922 |
| 587,317 | Great Britain | Apr. 22, 1947 |